United States Patent

Nishimura et al.

[11] Patent Number: 5,438,448
[45] Date of Patent: Aug. 1, 1995

[54] TURNING MIRROR AND METHOD OF MANUFACTURE

[75] Inventors: Tomoko Nishimura, Nara; Tomiaki Sakano, Hirakata; Katsuhiro Murano, Otsu, all of Japan

[73] Assignee: Matsushita Electric Industrial Co., Ltd., Osaka, Japan

[21] Appl. No.: 998,614

[22] Filed: Dec. 30, 1992

[30] Foreign Application Priority Data

Jan. 7, 1992 [JP] Japan .................................. 4-000641
Jul. 17, 1992 [JP] Japan .................................. 4-190447
Jul. 20, 1992 [JP] Japan .................................. 4-191820

[51] Int. Cl.⁶ .......................... G02B 26/08; G02B 5/08
[52] U.S. Cl. .................................. 359/214; 359/216; 359/850; 264/1.9
[58] Field of Search ............... 359/196, 212, 213, 214, 359/216, 217, 218, 219, 220, 846, 847, 848, 850, 221, 900; 264/1.9

[56] References Cited

U.S. PATENT DOCUMENTS

| | | | |
|---|---|---|---|
| 4,101,365 | 7/1978 | Fisli | 359/217 |
| 4,205,100 | 5/1980 | Fisli | 359/217 |
| 4,451,119 | 5/1984 | Meyers et al. | 359/846 |
| 4,592,622 | 6/1986 | Hashimoto et al. | 359/218 |
| 4,643,518 | 2/1987 | Taniguchi | 359/218 |
| 4,943,128 | 7/1990 | Takada et al. | 359/212 |
| 5,179,464 | 1/1993 | Morita et al. | 359/217 |

Primary Examiner—Loha Ben
Assistant Examiner—James Phan
Attorney, Agent, or Firm—Stevens, Davis, Miller & Mosher

[57] ABSTRACT

The present invention discloses the construction and manufacturing method of a turning mirror which has a single face or multiple face reflector mirror for scanning laser light in a laser beam printer and the like. The disclosed construction and manufacturing method achieve a low-cost and high-accuracy turning mirror. Photo-setting resin is coated onto the surface of a base mount having a rotating shaft at its center. The surface of the base serves as a substrate for reflector mirror. A glass plate having a good flatness is placed into contact with the resin coating layer. Resin setting light is operated to irradiate the resin coating layer with the peripheral side fringe of the resin coating layer partially or entirely open in order to set the resin coating layer. The glass plate is then separated from the resin coating layer, allowing the flatness of the glass plate to be transferred to the resin coating layer. The turning mirror is then fabricated by attaching a metallic film onto the resin coating layer.

7 Claims, 8 Drawing Sheets

NUMBER IN CIRCLE IS NUMBER OF LAYERS
→ REPRESENTS UPWARD OR DOWNWARD LEVEL

FIG. 9

EMBODIMENT
 (1) TRICYCLODECANE METHANOL

COMPARATIVE EXAMPLE
 (2) BIS-A EPOXY ACRYLATE
 (3) POLYHYDRIC PHENOL ACRYLATE
 (4) UNSATURATED POLYESTERACRYLATE
 (5) SPIRANE RESIN
     (DIALLYLDEN PENTAERYTHRITOL)
 (6) POLYBUTADIENE

TURNING MIRROR AND METHOD OF MANUFACTURE

BACKGROUND OF THE INVENTION

1. Field of the Invention

The present invention relates to a turning mirror having one or more reflective surfaces, which is applied to allow laser beam to scan in a laser beam printer and to a method for manufacturing such turning mirror.

2. Description of the Related Art

Recently more and more widely used as a printing terminal for information related machines are laser beam printers, which advantageously offer excellent quality, high-speed, and low mechanical noise printing on plain papers. Such a laser beam printer comprises a turning mirror which reflects laser light emitted by a laser device so that the reflected laser light may be directed onto a recording drum for recording.

Figure 11:
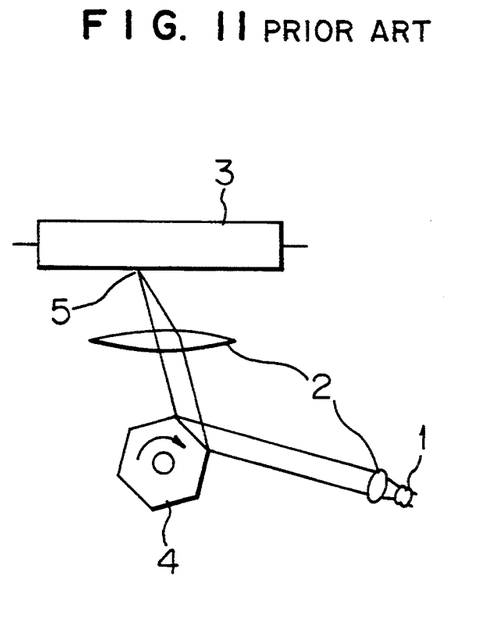
FIG. 11 illustrates the basic construction of an optical system of a conventional laser beam printer.

FIG. 11 is a partial view of a typical construction of a conventional laser beam printer. As seen from FIG. 11, the laser light emitted by a semiconductor laser device 1 which is driven by data signal is converged onto a recording drum 3 by a plurality of condenser lenses 2. A turning mirror 4 is disposed between these condenser lenses. The turning mirror 4 rotates at a high speed, causing the laser beam to scan, and consequently allowing a light spot 5 to scan over the recording drum 3. Meanwhile, the recording drum 4 slowly rotates in its subscanning movement which is combined with the already described main scanning movement, thereby allowing the light spot to form a two-dimensional latent image on the recording drum 3.

In such a scanning optical system described above, a turning mirror requires a high degree of accuracy in order to form the image of any given input picture on the recording drum 3. Specifically, to achieve a fixed scanning period and excellent printing quality, the inclination accuracy of the turning mirror with respect to its reference plane must be accurate to few tens of second in angle. Furthermore, the reflective surfaces of the turning mirror must meet the following rigorous requirements: a flatness accurate to a fraction of λ (λ period of helium-neon laser light, 632.8 nm), a surface irregularity of a few hundredths μm or less, and a reflectivity of 85% or more. To satisfy such accuracy requirements, in a conventional manner, pure aluminum bars have been machined to form structures, reflective surfaces on which are then put to a lathe for mirror finishing so that the reflective surfaces are accurate to required accuracy.

In a second conventional method, a turning mirror has been formed of entirely synthetic resin. In this method, an injection molding technique has been employed. Typically, polycarbonate has been employed as a synthetic resin. Reflective film is formed in deposition process onto surfaces to be used as a reflective surface.

In the case where a turning mirror is applied as a polarizer, a motor is coupled to the turning mirror by means of shrinkage fit or by means of gluing process accurately onto the rotating shaft of the motor, which is manufactured up to a good square, or accurately onto the hub mounted on the motor rotating shift.

In the above-described conventional arrangement and method of production, poor productivity results in the first convention example as a result of using mirror finish machining. The mirror finishing machining also needs an expensive numerical control cutting machine, pushing up manufacturing costs. In a single mirror-surface type turning mirror of which mirror surface is angled at approximately 45 degrees with respect to the axis of rotation, mirror finish machining cannot be performed in a stacked manner to a plurality of mirror surfaces at a time, because such a manner is expected to degrade accuracy in inclination. Thus, productivity is even more lowered.

In the second conventional method in which injection molding technique is applied to resin, all molds used must be of metallic one to withstand high pressure in molding process. To achieve required flatness and required surface irregularity on a polygon mirror by means of metal molds, material stability of the metal molds is critical. Mold materials which are capable of accurate molding normally exhibit poor processability, and thus the production of the molds are difficult process. Since injection molding is performed under high temperature and high pressure conditions, it is normally difficult to assure required accuracy on molded structures. Particularly, an irregularly configured structure such as a single mirror-surface type turning mirror presents difficulty in molding process. In the case of a multi-plane type turning mirror, assuring required inclination accuracy of each plane in injection molding process is even more difficult.

Since the resulting mirror of a molded structure is not symmetrical unlike a spherical surface, an ambient temperature rise easily gives rise to mirror surface deformation, which is sufficient enough to deteriorate the mirror beyond the flatness requirement. Thus, implementation of such method has been difficult.

Furthermore, when a reflector mirror fabricated by injection molding is used as a polarizer, some degree of degradation is introduced in accuracy of the reflector mirror when the reflector mirror is mounted on the axis of rotation of a motor or on a hub which is attached to the axis of rotation of the motor.

SUMMARY OF THE INVENTION

In view of the above problems, the present invention has been developed. It is an object of the present invention to provide a turning mirror which is low-cost, high-accuracy and easy to manufacture. It is also an object of the present invention to provide a manufacturing method of a turning mirror in which manufacturing steps are simple, and the assembly and adjustment of the turning mirror are easy.

In order to achieve the above objects, the present invention comprises a base mount having at its center a rotating shaft, a support pole extended from the rotating shaft having at its top end a slantly plane serving as a reflector mirror substrate, a photo-set resin layer attached onto the reflector mirror substrate of the support pole, and a reflector mirror surface formed onto the photo-set resin layer having as its principal element a metallic film, whereby the reflector mirror surface is rotated by rotation of the rotating shaft in order to scan light reflected by the reflector mirror surface.

The present invention further comprises the base mount which is polygonal, a plurality of reflector mirror substrate, each of which is formed on each side surface of the polygonal base mount, a photo-set resin layer attached onto each reflector mirror substrate, and a reflector mirror surface formed onto each photo-set resin layer having as its principal element a metallic film, whereby the reflector mirror surface is rotated by rotation of the rotating shaft in order to scan light reflected by the reflector mirror surface.

The present invention comprises a resin layer on the reflector mirror substrate is made up of multiple film layers and a reflector mirror surface formed of metallic film disposed on the multiple resin film layers, whereby the reflector mirror surface is rotated by rotation of the rotating shaft in order to scan light reflected by the reflector mirror surface.

In the turning mirror, according to the present invention, in a process of forming multiple resin layers, a high accuracy mirror surface is achieved by setting a surface irregularity of the multiple resin layers except the outermost resin layer to Rmax 0.3 μm or more, and by setting a surface irregularity of the outermost resin layer smaller than required mirror surface irregularity.

In the turning mirror in which coated resin film meeting mirror surface grade accuracy is formed, and one or more mirror surfaces are provided onto the coated resin film by forming a high light reflectivity film, the resin contains at least composition selected from the following group A components and compositions selected from the following group B components. Group A: polyacrylate or oligoacrylate being polyacrylic based ester or oligoacrylic based ester obtained as a result of coesterification of at least polybasic acid, polyhydric alcohol, and acrylic acid or methacrylic acid, wherein the polybasic acid or polyhydric alcohol is of alicyclic structure. Group B: Photo-setting agents.

According to the present invention, a turning mirror is manufactured by coating a resin wherein the polyhydric alcohol having alicyclic structure is a compound selected from tricyclodecane dimethanol, 2–8 mol adduct of ethylene oxide with tricyclodecane dimethanol, and 2–8 mol adduct of propilene oxide with tricyclodecane dimethanol.

According to the present invention, a turning mirror is manufactured by coating photo-set resin in the form of film layer on the mirror surface substrate of a base mount having one or more faces, by placing a setting light transmitting glass plate into contact with coated resin layer with the peripheral fringe of the coated resin layer partially or entirely open, by positioning and holding the base mount, the coated resin layer made of the photo-setting resin and the glass plate, by irradiating a setting area with setting light via the glass plate, separating the glass plate from the resin layer when fully set, and forming a reflective film capable of reflecting light on the resin coating layer.

In the above arrangement, good flatness photo-set coating layer is formed by transferring the surface of the glass plate to the substrate of the peripheral of the base mount of cylindrical or prismatic configuration, and then forming the thin film onto the resin coating layer. Thus, a turning mirror may be manufactured for low manufacturing costs.

Since the resin coating layer formed onto the substrate of the reflector mirror surface is of multi-layer construction, good flatness-accuracy resin film is formed by transferring accurately the geometry or surface of a mold or transfer plate. High-accuracy turning mirror may be thus manufactured. While resin sets, a few percent to a few tens percent of shrinkage occurs. Even in a base mount of poor flat accuracy, resulting flatness of resin layers may gradually be made uniform by each layering of resin. Thus, good quality of transferring of the geometry or surface of a mold or a transfer plate is assured.

Since the base mount which provides thermal stability is disposed in center, a substantially uniform thickness coating of resin is assured. A turning mirror fabricated is thus stable, with less dimensional changes against ambient temperature variations. In the turning mirror, the rotating shaft may be attached to the base mount at its center by means of shrinkage fit or the like, and photo-setting resin may be coated onto the surface of the base mount intended to be a substrate for mirror surface, using as a reference the rotating shaft. When the turning mirror is applied as a polarizer, its manufacturing steps are simplified. No compensation for inclination is required, and assembly and adjustment are easy.

According to the above manufacturing method, molds are dispensed with, and open jigs will do. Since high temperature and high pressure conditions are not required, working conditions for assuring required accuracy are easily determined.

Resin intended for use as mirror surface should meets thermal resistance and coldproof requirements which a polygon mirror normally meets. Resin should also humidity resistant, and its shrinkage rate in its process should be small. Resin also should have a processability that allows good initial flatness accuracy. Generally speaking, photo-setting resins have a larger hygroscopicity than thermal-setting resins, and a larger shrinkage rate. According to the present invention, both hygroscopicity and setting shrinkage rate are set small by using photo-setting resins having alicyclic structures. Thus, high-accuracy and reliable mirror is achieved.

Photo-setting resins having alicyclic structures is poly- or oligo-acrylate which is poly- or oligo-acrylate ester obtained as a result of Coesterification of at least polybasic acid, polyhydric alcohol and acrylic acid or methacrylic acid, wherein the polybasic acid and the polyhydric alcohol each have alicyclic structure and photo-setting agent.

Tricyclodecane dimethanol or 2–8 mol adduct of ethylene oxide with tricyclodecane dimethanol is preferred as polyhydric alcohol from among poly- or oligo-acrylate having alicyclic structures.

Oligo acrylate ester having alicyclic structures is preferably used with its percentage set to 20% or more with respect to the sum of oligo acrylate ester itself, photo-setting monomer, oligomer and polymer.

B component photo-setting agents are for example, benzoin based compounds such as, benzoin, benzoin methyl ether, benzoin ethyl ether, benzoin isopropyl ether, benzoin isobutyl ether, α-methyl benzoin, and α-phenyl benzoin; anthraquinone based compounds such as anthraquinone, methyl anthraquinone; benzyl; diacetyl; acetophenone; benzophenone; phenyl ketone compounds, such as methylorthobenzoyl benzoate, ethylorthobenzoyl benzoate; sulfide compounds such as diphenyldisulfide, tetramethyl thiuram sulfide; α-chloromethyl naphthalene; hydrocarbon halide, such as anthracene, hexachlorobutadlene, pentachlorobutadiene.

In applying B component photo-setting agents, preferred applied component ratio by weight is 0.1–10 parts, more preferably 1–5 parts of B component photo-setting agents to 100 parts of the sum made up of A components of poly- or oligo-acrylate, photo-setting monomer, oligomer, and polymer.

Amine based photo-induced polymerization accelerator may be mixed to shorten setting time of components according to the present invention in air and to reduce the consumption of photo-setting agent.

DETAILED DESCRIPTION OF THE PREFERRED EMBODIMENTS

Figure 1A:
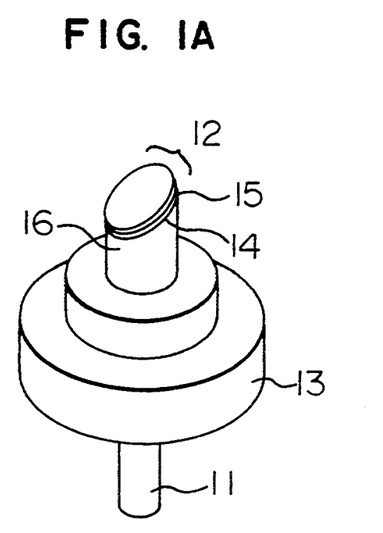
FIGS. 1A and 1B are perspective views showing an embodiment of a single-mirror type turning mirror and a multi-mirror type turning mirror respectively.
Figure 1B:
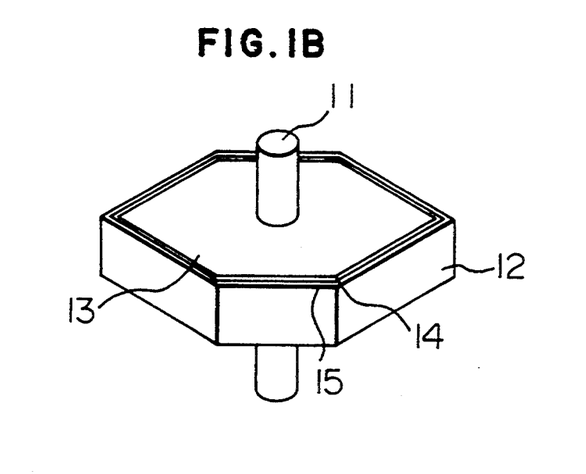

Referring now to the drawings, embodiments of the present invention will be discussed below. FIGS. 1A and 1B show a rotating single mirror-surface construction and a rotating six-mirror-surface construction, respectively. As seen from FIG. 1A, the reflector mirror surface 12 of the single mirror-surface construction is angled at 45 degrees with respect to a rotating shaft 11. In the single mirror-surface construction, a support pole 16 is formed of molded resin, metal, or alloy. In the hexagon-mirror construction, a base mount 13 having a hexagon column portion may be formed of molded resin, metal or alloy. When the base mount 13 is formed of mold resin, its material may be one of engineering plastics (for example, polycarbonate, polyamide, polyacetal, polyphenylene oxide, polyethylene terephthalate, and polybutylene terephthalate), resin blended with additives (for example, silica, woodflour, calcium carbonate, glass fiber, metallic power and the like) for the purpose of improving rigidity, thermal characteristics and cure shrinkage, or recently noticed liquid crystal polymer. When the base mount 13 is formed of a metal or an alloy, Al, Cu or its alloy may be used. In selecting the material for the base mount 13, its surface machining accuracy and processability are not very important. It is important that the base mount 13 has an area sufficient enough to form reflective mirror surfaces on it, and wide enough to accurately be fixed and aligned onto a rotor. It is also important that the base mount 13 has a proper volume and weight to keep itself in balance during rotation, withstands external forces such as centrifugal force with sufficient margin, has sufficient rigidity capable of supporting resin layers and reflective mirror surfaces, and works in a manner that minimizes thermal transfer from the motor side to the resin layers and the reflected mirror surfaces.

Reflective surface portion 12 is made of an approximately 100 μm thick resin layer 14 and a high reflectivity metallic film 15 formed on top of the resin layer 14. These make up a mirror surface of which reflectivity is greater than 85% or more. The high-reflectivity metallic film 15 may be any one as long as it reflects efficiently light in laser light wavelength range. Sputtering or deposition technique may be used to film forming of Al, Au, Cu, Ag, Ni, Cr or an alloy made of some of these metals. The thickness of the metallic film ranges from several hundreds Å to several thousands Å. When sputtering technique is employed, Al film, for example, is preferably 500Å or thicker to assure a high reflectivity. However, Al film of 1000Å or thicker is subject to whitening. Thus, appropriate thickness should be selected depending on metal in use. When the metallic film is formed of soft metal, a rotating mirror coupled to a motor is rotated at a high speed, dust particles in air may hit the mirror surface, damaging the mirror surface. To protect the mirror surface from such damage and to improve moisture resistance characteristic (thus, corrosion resistance characteristic), a protective film is preferably formed on the metallic reflective surface 15 using deposition or sputtering technique, wherein the protective film is made of material exhibiting high transmittance and high hardness, (for example, $SiO_2$, $Al_2O_3$ or a compound made of these components mixed with an additive), so that the mirror's reflectivity against laser light is not affected.

In the above construction, the base mount 13 for the rotating mirror is formed of material which is thermally stable and sufficiently rigid, and thus, the turning mirror is stably operable to rotate at a high speed under thermally stable conditions. Furthermore, since the turning mirror may be fabricated by low-cost materials, manufacturing costs are substantially reduced. The rotating shaft 11 is attached to the base mount 13 by means of shrinkage fit or other technique. An photo-set resin layer is then formed on any surface of the base mount 13 to be used as a mirror surface, with respect to the rotating shaft 11. The metallic film 15 is formed on top of the resin layer. According to this method, adjustment step for compensating for inclination of the reflective mirror surface is dispensed with, and thus manufacturing steps are simplified. If the turning mirror fabricated as above is used as light polarizer, its assembly and adjustment is simplified.

Figure 2A:
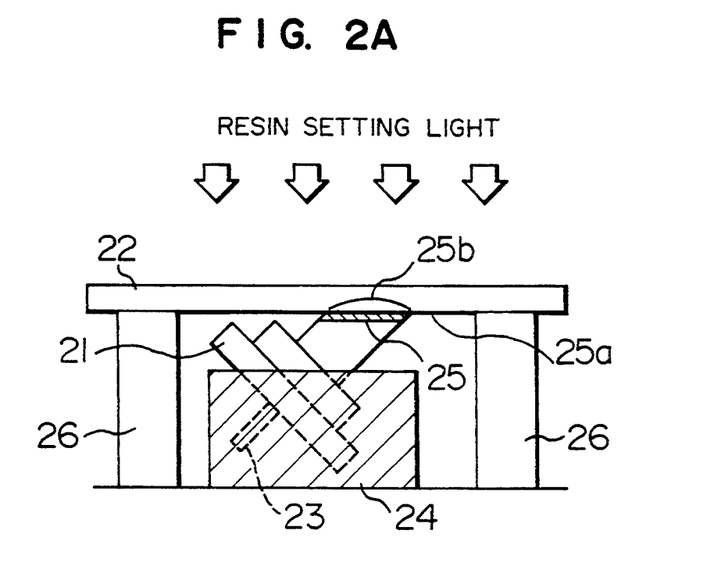
FIG. 2A is a side view showing the manufacturing method of the single-mirror type turning mirror.
Figure 2B:
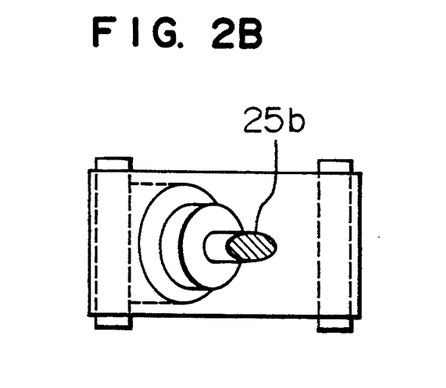
FIG. 2B is a top view showing the manufacturing method of the single-mirror type turning mirror.

FIG. 2A and FIG. 2B show an embodiment of a manufacturing method of a single mirror-surface type turning mirror using photo-set resin.

The surface of a base mount 21 intended to be a mirror surface substrate is subjected to surface treatment as appropriate to increase adhesion with a photo-setting resin. As seen from the Figures, the rotating shaft is coupled to the base mount 21 and the assembly is held so that the mirror surface substrate of the base mount 21 is kept in substantially parallel with a glass plate 22 functioning as a transfer plate from which a mirror surface is transferred. The assembly is also mounted onto a base mount holder 24 so that the rotating shaft 23 is angled at a predetermined inclination. The photo-setting resin 25 is coated onto the mirror substrate, the mirror surface transfer glass plate 22 is then placed onto the glass support base 26 while keeping the glass plate 22 in contact with the photo-setting resin 25, so that the photo-setting resin 25 is in uniform width. Ultraviolet light is evenly directed to a transfer surface 25b with the side 25a of the photo-setting resin 25 open. After the resin is cured, the glass plate 22 is separated from the resin.

In step 1 in the manufacturing method of the turning mirror in this embodiment, by placing the photo-setting resin is between the glass plate and the surface of the base mount intended to be a reflector mirror surface, and then by allowing the resin to set, excellent flatness and irregularity of glass surface are transferred to the surface of the photo-setting resin. Thus, high accuracy resin surface is achieved. By directing ultraviolet light to the photo-setting resin with the fringe portion 25a of the photo-setting resin left partially or entirely open, the photo-setting resin is allowed to move within its layer keeping its thickness even if shrinkage occurs during the setting during of the resin. Thus, in-molded strain existing within the resin layer after curing is reduced, and surface accuracy is improved. To coat a resin layer onto a configured solid body, conventionally the solid body is placed inside a closed mold, and resin is then cast onto the solid body inside the closed mold. Casting, however, encloses the fringe portion, i.e., side portion of the transfer surface inside the mold. When the photo-setting resin shrinks in the course of setting, unset portion of the resin tends to move to compensate for and alleviate shrinkage. Such a movement, however, is restricted because an affinity by wetting between the inner wall of the mold and the resin gives rise to a force which attracts resin toward the inner wall. In the manufacturing method according to the present invention, the side portion of the resin layer is partially or entirely open, no external force acts on the side portion of the resin layer. This facilitate the movement of resin and assures efficient compensation movement for shrinkage. When resin setting light is directed, the light may be uniformly directed if employed glass plate 22 has a light transmission opening large enough to accommodate, within its photo-setting light projection area, most of the fringe portion 25a of the resin coating surface 25b as shown in FIG. 2B. Thus, in-molded strain is reduced. Without no turbulence introduced on flatness of the resin, flatness and irregularity of the glass plate 22 are transferred. Since no residual unset resin portion is left, there is no need for removal step and cleaning step.

In step 2, metallic reflector film is formed on top of the set resin as shown in FIGS. 1A and 1B and, furthermore, a protective film may be disposed on the metallic reflector film as appropriate.

Since accuracy as a mirror surface is determined by the resin layer 25, no rigorous accuracy requirement is imposed on the substrate surface of the base mount 21. Thus, material requirement for the base mount 21 may be alleviated. In this embodiment, molds are not required, and open-type jigs are sufficient to fabricate, with no need for high temperature and high voltage conditions. A glass plate 22 only is used as a transfer plate. The glass plate 22 may be any type which exhibits a good transmittance in light wavelength range which is applied to set the photo-setting resin 25. Silica glass or glass having permeability to ultraviolet light may be acceptable. Polishing these glasses in advance easily achieves good surface accuracy. The reflector mirror surface 25b is obtained by transferring such a surface, and a large number of good surfaces may be manufactured by the glass plate 22. Since this embodiment employs a photo-setting resin as material for a resin layer, productivity is substantially high compared with the case with other type of resin. Furthermore, since light is employed to set resin, it is possible to improve the setting condition by adding photo-induced polymerization initiator or the like. This improves productivity even more.

The reflector surface substrate of the base mount may be processed to reinforce adhesion with a photo-setting resin. Adhesion is reinforced so that the photo-setting resin remains securely attached onto the base mount 21 side when the glass plate is separated after the photo-setting resin is applied between the glass plate 22 and the base mount 21 and is allowed to set in there. Particularly when the base mount 21 is formed of resin, various low molecular blends such as plasticizer, age resistor, surface-active agent and parting agent possibly contained in the resin may migrate externally to the resin surface. Of advantage is the surface treatment including removing these blends by cleaning with an agent or by polishing, and applying a priming solution having polar group on the resin surface and then allowing it to dry. When the base mount is formed of a metal or an alloy, hydroxyl groups are placed on each interface of the base mount 21 and the glass plate. Thus, bonding strength (adhesion) of the photo-setting resin with the base mount 21 tends to match the bonding strength of the photo-setting resin with the glass plate. Thus, it is advantageous to make difference between both adhesions by performing surface treatment onto the base mount 21 side, priming operation is easy using dip, spray, or brushing. Silane coupling agent, titanate coupling agent or chromic coupling agent may be used as a surface treatment agent. For example, when the base mount 21 is Al and the photo-setting resin is acrylate resin., the use of silane coupling agent having acryloyl group at one end substantially improves adhesion with the photo-setting resin. If the adhesion of the photo-setting resin itself is large enough, no particular priming process is required. When there is almost no substantial difference between adhesion of the resin and breaking strength of the resin, or when adhesion of the resin with the glass plate is too large to ignore, it requires that an extremely low concentration release agent be applied onto the glass plate 22. The release agent should be substantially evenly applied on the glass surface. All above treatments help the glass plate to easily separate from the photo-setting resin 25 without the photo-setting resin peeling off the base mount 21. Fabricated described as above is a transferred resin film which has an adhesion strength with which the resin film is free from peeling off the base mount against centrifugal force even when the turning mirror is rotated at a high speed ranging from a few thousands rpm to a few tens of thousands rpm by a coupled motor.

Resin coating may be applied by filling space between the glass plate and the base mount with resin after the glass plate is positioned and fixed. To prevent air bubbles from being introduced and burrs from developing, however, the glass plate is preferably placed from above after resin is uniformly applied onto the base mount using a micro dispenser and a coater.

Viscosity of resin in use is preferably within a range of 50–5000 cps. The resin within this range properly stays between the surface of the base mount intended to be a mirror surface and the glass plate without running over to peripheral areas, but still spread properly over the surface of the glass plate with no burr development. Thus, processability is greatly improved.

The thickness of the resin film is at least greater than the magnitude of undulation plus irregularity of the base mount. If the resin is too thick, however, required amount of light dramatically increases, and setting time increases as well. Furthermore, if the resin layer is too thick, light is unable to penetrate deep into the resin, and the resin layer tends to be left partially unset. Furthermore, the thicker the resin layer the more the undesired dimensional change. Thus, thin resin layer as thin as 5–300 $\mu$m is preferable.

Figure 3A:
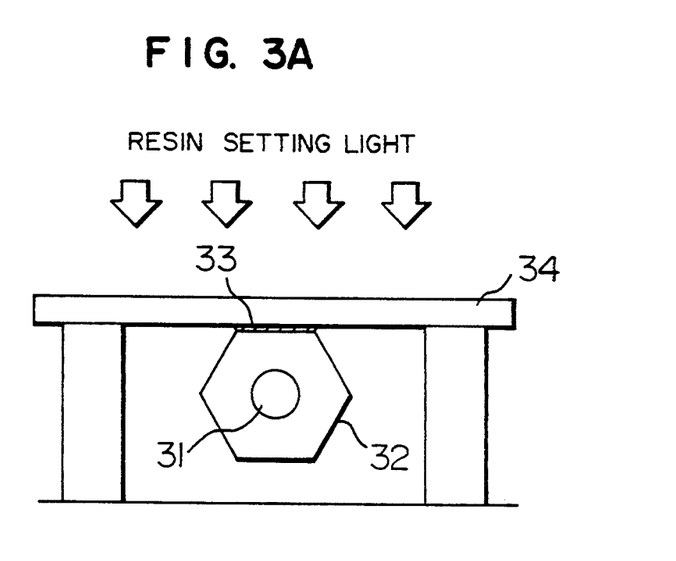
FIG. 3A is a front view showing the manufacturing method of the hexagon-mirror type turning mirror.
Figure 3B:
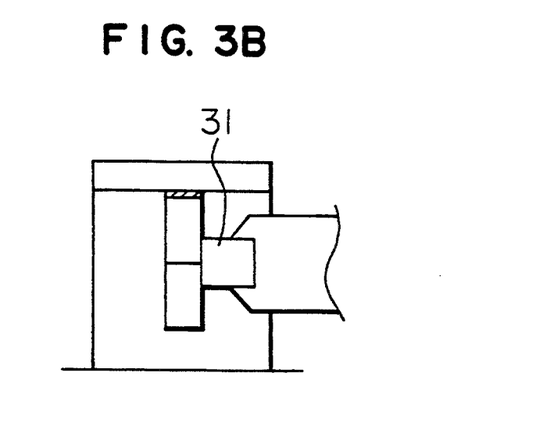
FIG. 3B is a side view showing the manufacturing method of the hexagon-mirror type turning mirror.

The method described above will be equally applied to a polygon mirror. FIG. 3A and FIG. 3B show an embodiment of a manufacturing method of a turning hexagon mirror. As seen from the figures, a base mount 32 having at its center a rotating shaft 11 is held so that the length of the rotating shaft 31 is aligned horizontally. A photo-setting resin 33 is applied to each surface of the base mount 32 intended to be used as a substrate for a reflective surface. In a manner similar to the first embodiment, a glass plate 34 is placed. Photo-setting resin layer is irradiated by setting light sequentially to fabricate a polygon mirror. Required setting time for photo-setting resin is normally short, typically from a few seconds to tens of seconds. Total time required is not so long even if all the resin coated surfaces are set one by one successively. Setting a plurality of resin coated surfaces at a time may be performed, for example, by directing setting light from both left and right sides or from up and down sides in a manner that prevents any two mutually boarding surfaces from being set at the same time. This greatly improves productivity.

Forming resin coating structure may be performed on the base mount with no rotating shaft mounted as long as the base mount is held onto a jig. After completion of reflector mirror, the base mount may be coupled to a motor shaft or to a hub which is attached to the motor shaft.

The turning mirror having the above described construction and fabricated according to the above described method offers satisfactory mirror finish. Disposing more layers of resin however will achieve even more accurate mirror surface. Resin normally shrinks a few percent to tens of percent while it sets. Each time a new resin layer is attached, thickness uniformity of resin layers improves. Even when a base mount with poor surface accuracy is used, transferability of geometry and surface of a mold or a transfer plate will be improved by layering.

Figure 4:
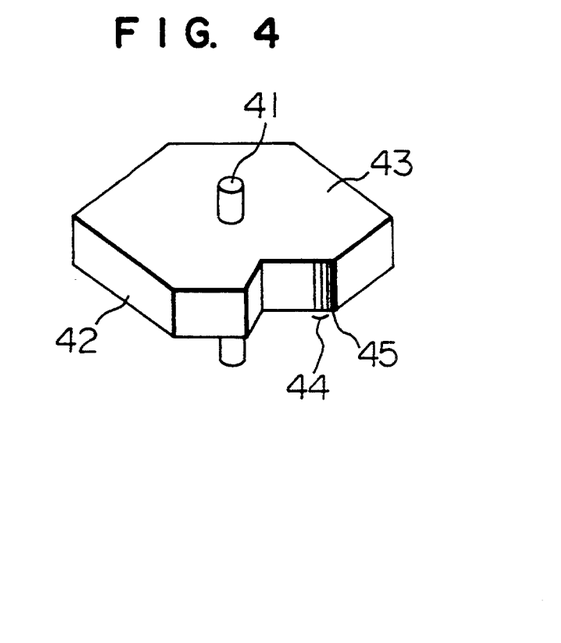
FIG. 4 is a partially cutaway perspective view of the hexagon mirror type turning mirror according to an embodiment of the present invention, wherein the resin layer is of multi-layer construction.
Figure 5:
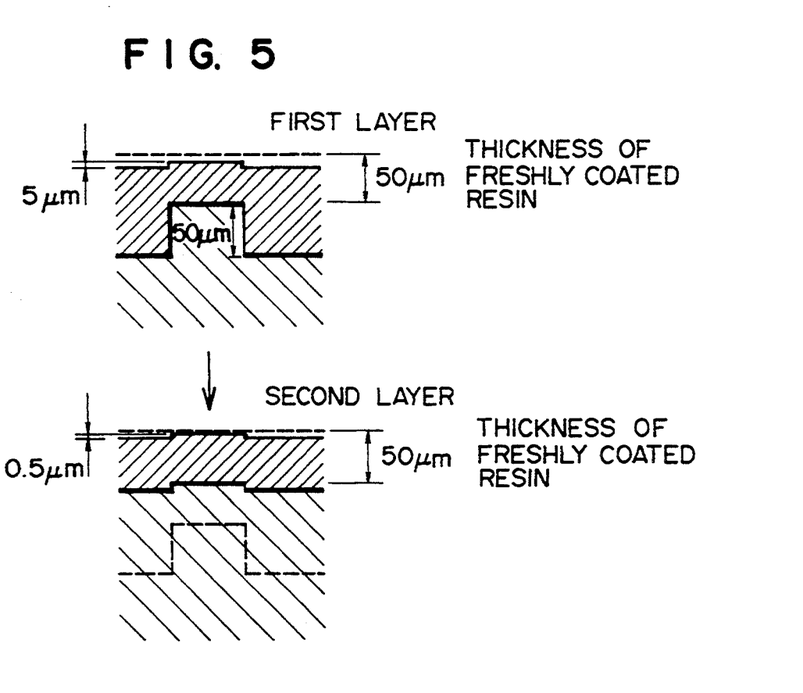
FIG. 5 illustrates flatness change depending on each layering addition when multi-layer construction is formed.

FIG. 4 shows a partially broken view of the structure of an embodiment of a turning polygon mirror. The turning polygon mirror comprises a base mount with a rotating shaft at its center, wherein multiple resin layers are disposed on to the reflector mirror substrates, and reflector mirrors are formed by providing a metallic film on top of the multiple resin layers. FIG. 5 illustrates how flatness improves by laminating multiple resin layers.

The volume shrinkage of photo-setting resin is typically 5–20%. In FIG. 5, for convenience, a resin with a linear shrinkage rate of 10% and with a thickness of 50 $\mu$m is laminated onto a base mount which has a projected step as high as 50 $\mu$m. The projected step as high as 50 $\mu$m may cause a thickness difference of 50 $\mu$m maximum. When the resin sets at a linear shrinkage rate of 10%, however, flatness on the first resin layer falls within 5 $\mu$m on the base mount side. When a second resin layer is coated, maximum thickness difference considered is 5 $\mu$m. With the second resin layer setting, flatness is within 0.5 $\mu$m. Similarly, a third and outermost resin layer coating will achieve a flatness of 0.05 $\mu$m if a transfer plate has a good flatness. The use of a single resin layer only cannot accommodate a large projected step even if an extremely flat transfer plate is employed. Since resin setting is associated with shrinkage, limitations on transferability are unavoidable. Multi-layering thus makes it possible to transfer a high flatness state. The effect of multi-layering in real transfer operation will not as exactly work as calculated here, however. The advantage of multi-layering is further discussed referring to FIG. 8.

Figure 6A:
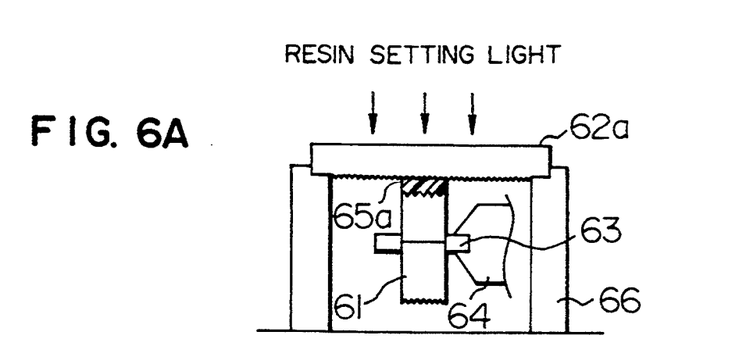
FIG. 6A illustrates the manufacturing method of multi-layered resin surface hexagon mirror, wherein first resin layer is being formed.
Figure 6B:
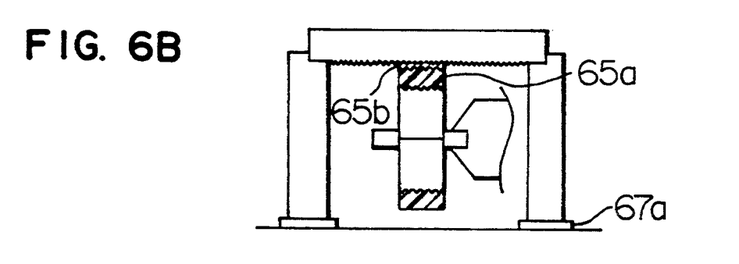
FIG. 6B illustrates the manufacturing method of multi-layered resin surface hexagon mirror, wherein second resin layer is being formed.
Figure 6C:
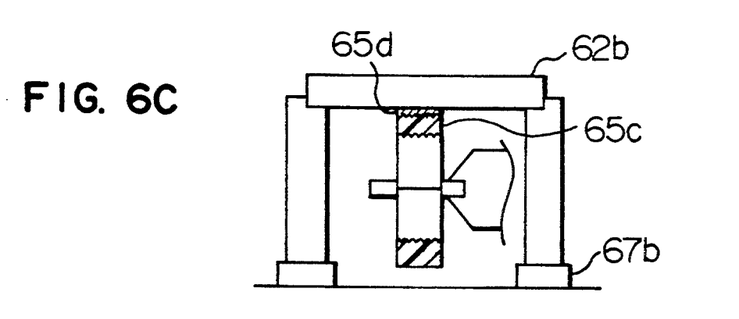
FIG. 6C illustrates the manufacturing method of multi-layered resin surface hexagon mirror, wherein outermost resin layer is being formed.

FIG. 6 illustrates a manufacturing method of a turning hexagon mirror with photo-setting resin coating as an embodiment of forming resin multi-layers.

FIG. 6A illustrates the formation of a first resin layer. A rotating shaft 63 is held onto a base mount holder 64 so that a surface of a base mount 61 with the rotating shaft 63 at its center to be intended to serve as a substrate for mirror surface faces a glass plate 62a functioning a transfer plate from which a surface is transferred, and so that the rotating shaft 63 is angled with respect to the glass plate 62a at a predetermined angle, photo-setting resin is coated onto the substrate surface of the base mount 61, and the surface transfer glass plate 62a is placed onto glass plate positioning mount 66 so that a desired thickness results in resin 65a. Under this setup, the photo-setting resin is irradiated by setting light in a uniform manner. After resin setting, the glass plate 62a is separated from the set resin. The transfer plate 62a just now used is a good flatness glass plate which is roughened to a surface irregularity of 0.3 $\mu$m or more by etching or polishing.

FIG. 6B illustrates the forming a second layer to a layer immediately beneath the outermost layer. The glass plate positioning mount 66 is elevated, from the level where the first resin layer was formed, by a distance equal to the thickness of the second resin layer. In a method similar to the first resin layer forming, the second resin layer is set and the glass plate is separated. Each of subsequent layers including the layer immediately beneath the outermost layer are similarly formed by elevating the glass plate positioning mount successively. Thus, multiple layers are easily fabricated.

FIG. 6C illustrates the forming of the outermost resin layer. Assuming that n layers are formed, the inner layers including (n−1)th layer may be fabricated according to the above method. By using, as a transfer plate, a glass plate having excellent flatness and surface irregularity as a transfer plate in forming the outermost layer, a good irregularity is achieved on the set resin surface from which the glass plate is separated.

As already described referring to FIGS. 1A and 1B, in the course of manufacturing the turning mirror, a high reflectivity film and a protective film may be formed on the multi-layered resin.

In multi-layering process, one resin layer is coated and then set on top of another. It is important that resin-to-resin adhesion is set greater than adhesion of resin-to-transfer glass plate or adhesion of resin-to-mold in order to form solid resin layers onto the base mount. Normally, resin has greater adhesion with inorganic matter such as glass and metal than with resin surface. Thus, applying a release agent onto the transfer plate side is not sufficient enough. For this reason, some degree of irregularity is advantageously given to the set resin surface of each of the first layer to (n−1)th layer in order to reinforce adhesion between one layer and another on top of the first layer in a physical manner. However, it is meaningless if the increased surface irregularity is set large enough to degrade flatness to the extent that the current flatness is worse than what it was before resin forming. An irregularity of Rmax 0.3 μm or more works to improve adhesion in a physical manner. Used as a transfer plate for resin layer forming for the first layer to (n−1)th layer is a glass plate of good flatness which is evenly roughened by etching or polishing. This allows the surface irregularity of each layer to be properly controlled while a base mount is improved in its flatness. Since the outermost resin surface constitutes a reflector surface, a glass plate or a mold with excellent flatness and irregularity is used as a transfer plate.

Although priming process may be possibly applied to each layer forming to reinforce resin-to-resin adhesion, such additional steps complicate the entire process. Physical process such as roughening of the surface already described is more advantageous. If a release agent is applied to the glass plate, residual release agent possibly remains attached to the surface of the resin coating surface from which the glass plate is separated after setting. Since the release agent degrades adhesion of succeeding resin layer forming, a cleaning step should be added as appropriate.

Figure 7:
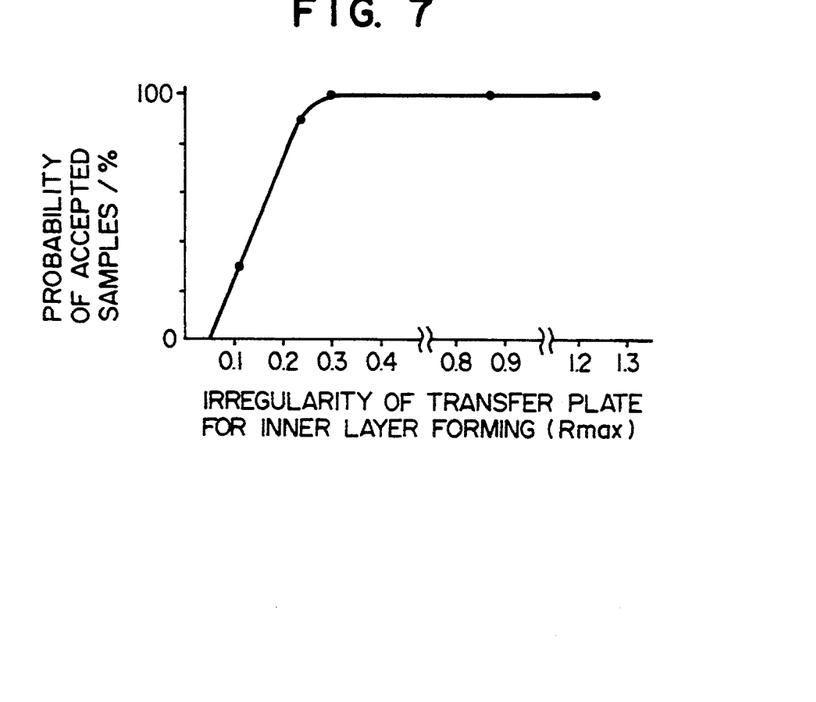
FIG. 7 plots reliability of a succeeding resin layer, wherein the succeeding resin layer is formed by using the transfer glass plate which has a different irregularity from that of the transfer glass plate used for formation of a preceding resin layer.

FIG. 7 shows the probability that a second resin layer is formed in a satisfactory manner, wherein a two-layered resin structure is fabricated by using photo-setting resin according to the method illustrated in FIG. 6, by changing the irregularity of a transfer glass plate used to form a first resin layer and by forming the third resin layer using a mirror-grade transfer glass plate. When the transfer plate used for forming the inner layer has an irregularity of Rmax 0.3 μm or less, no reliable adhesion is achieved: the second resin layer tends to remain partly stuck to the transfer plate side when the transfer plate is detached from the second resin layer after the second resin layer is set. It should be noted that fluorine-based release agent was applied to the transfer plate and the base mount was a coupling agent processed Al.

Figure 8:
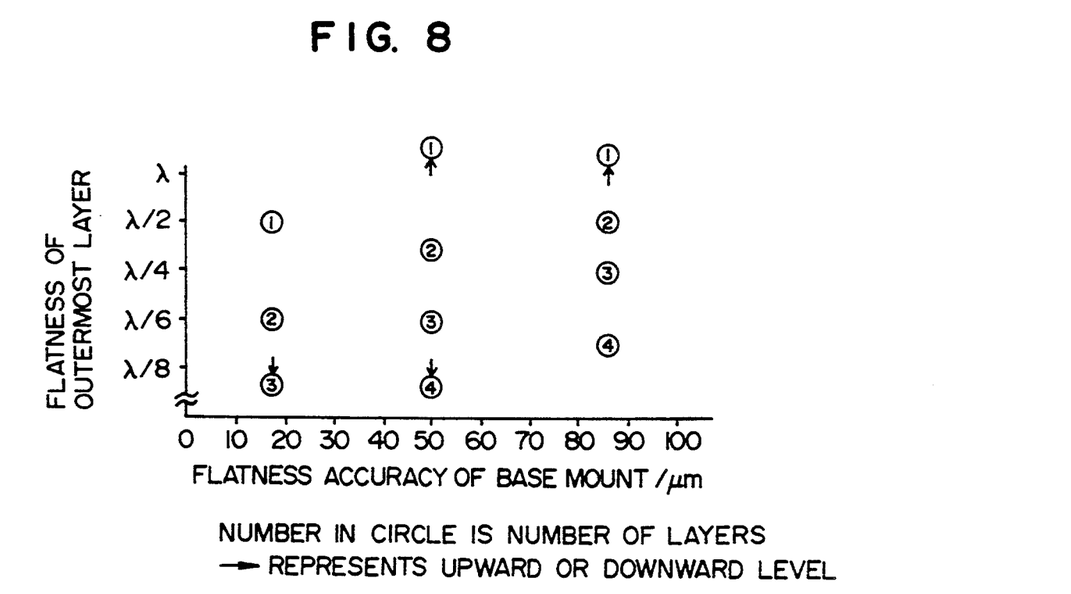
FIG. 8 plots flatness test results showing how flatness varies depending on the number of layers according to various flatness accuracies of base mount.

FIG. 8 is a graph showing how flatness changes depending on the number of layers. Multiple layers were formed. Photo-setting resin was used according to the method illustrated in FIG. 6. Used to form the inner resin layer forming was a mirror-grade transfer glass plate which was roughened to Rmax 0.8 μm by etching. The outermost resin layer was formed by a mirror-grade accuracy transfer glass plate. The accuracy of the base mount represented by the abscissa in FIG. 8 is a maximum value when the outline geometry of the base mount including both surface undulation and irregularity is measured. Each resin layer is 50 μm thick. A single resin layer is incapable of accommodating the irregularity of the base mount if the accuracy of the base mount is too poor. Multiple-layer structure assured mirror-grade accuracy.

The improvement of transferability by means of multi-layering is advantageously applied not only to photo-setting resin, but also to a resin associated with shrinkage. This method may also be advantageously applied to thermosetting resins, such as epoxy resin and unsaturated polyester resin, which generally exhibit smaller shrinkage than photo-setting resins.

The use of photo-setting resins allows productivity to increase because of their short setting time. If shrinkage in the course of setting is too large, however, transferability of the transfer surface of a transfer plate is degraded, presenting difficulty achieving flatness required for a turning mirror. General environmental conditions the turning mirror must withstand are heat resistance requirement of 60° C., and humidity resistance requirement of 40° C., 90% RH. It is required that no deformation take place under such conditions.

Figure 9:
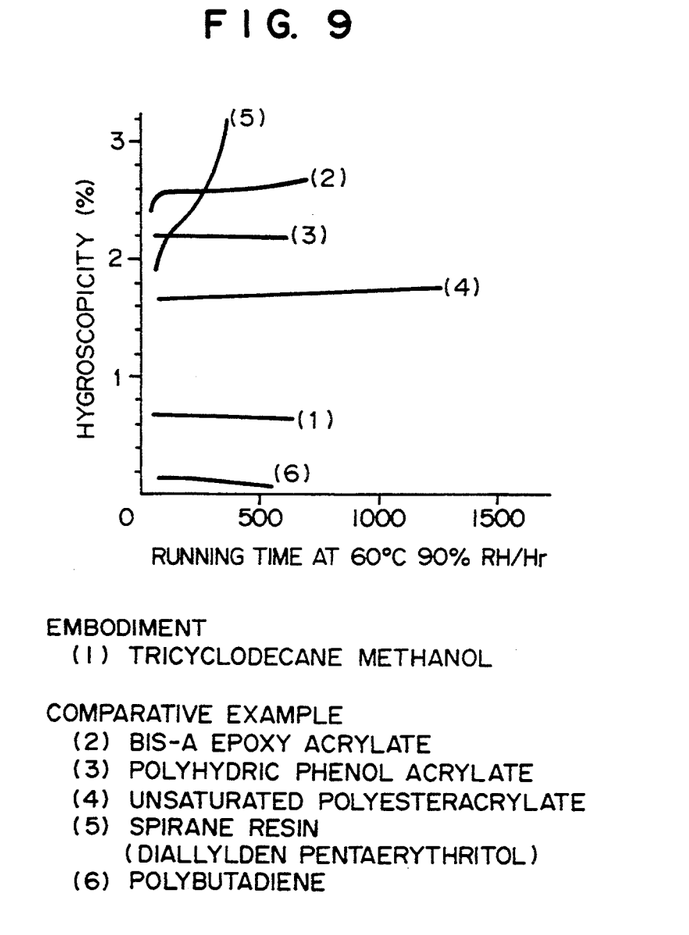
FIG. 9 plots hygroscopicity test results of various photo-setting resins under 60° C., 90% RH.

FIG. 9 shows hygroscopicities of several photo-setting resins which were tested under environmental conditions of 60° C., 90% RH. Embodiment (1) is a set resin of a photo-setting resin which is obtained by mixing and preparing 100 parts acrylate resin and 3 parts benzophenone by weight, wherein acrylate resin is obtained by esterifying tricyclodecane methanol with acrylic acid. Comparative examples (2)–(6) are respectively bis-A epoxy acrylate, polyhydric phenol acrylate, unsaturated polyesteracrylate having no alicyclic structure, diallyidene pentaerythritol, and polybutadiene acrylate. As seen from FIG. 9, embodiment (1) and comparative example (6) polybutadiene acrylate exhibit excellent humidity resistance.

Table 1 lists linear shrinkage rates, during setting, of the photo-setting resins plotted in FIG. 9.

TABLE 1

| Test \ Resin | (1) | (2) | (3) | (4) | (5) | (6) |
|---|---|---|---|---|---|---|
| Linear Shrink % | 1.6 | 3.1 | 2.0 | 3.1 | 4.8 | 0.5 |
| Initial Flatness | $\lambda/4>$ | $\lambda/2<$ | $\lambda/4 - \lambda/2$ | $\lambda/4 - \lambda/2$ | $\lambda/4>$ | $\lambda/4>$ |
| Life Test 70° C. | No change | No change | No change | No change | Flat. worse | Wrinkle |
| Life Test 60° C. 90% RH | ↑ | Flat. worse | Flat. worse | Crack | Crack | Wrinkle |
| Life Test 0° C. | ↑ | No change | No change | No change | No change | No change |
| Life Test Heat Shock −30 + 80° C., 100 cyc | ↑ | Flat. worse | Flat. worse | Flat. worse | Crack | Wrinkle |

Table 1 also lists initial flatness and change in flatness after various environment tests of different conditions wherein, flatness was measured on each of the resin layer structures formed of the same photo-setting resins in FIG. 9, on a Al base mount according to the method shown in FIG. 3. Shelf tests were conducted at various conditions for a duration of about 300 hours, and change of state of the layers are listed. The result of heat shock test includes test result of up to 100 cycles. In initial flatness measurement, comparative example (6) polybutadiene acrylate out-performed the rest of the resins. In reliability tests such as heat resistance test, high temperature and high humidity tests, however, the comparative example (6) develops wrinkle. This seems due to resin's large thermal expansion and low hardness. The comparative example (6) has low hygroscopicity, thus deems good, but poor in heat resistance characteristic. The remaining comparative examples suffer change of flatness in high temperature, high humidity tests, and develop undesirable surface irregularity, and some of them change under heat resistance test. The embodiment (1) of photo-setting resin has low hygroscopicity and is thus less subject to humidity as seen from FIG. 9. The embodiment (1) exhibits excellent result not only in high temperature, high humidity tests, but also in any of reliability tests. The embodiment (1) offers a good surface transferability from a transfer plate. This is because shrinkage rate during setting is small and film's strength and flexibility are well balanced. Thus, flatness after setting is also excellent.

Figure 10:
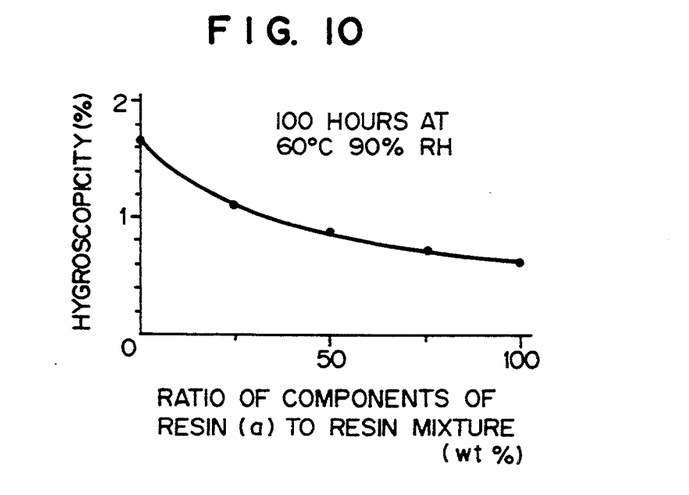
FIG. 10 plots hygroscopicity test results with the ratio of components changing under 60° C., 90% RH

FIG. 10 illustrates hygroscopicity of a combination mixture consisting photo-setting monomer, oligomer and polymer of acrylate resin obtained by esterifying tricyclodecane dimethanol with acrylic acid and acrylate resin itself, wherein the ratio of components is varied in the combination mixture. Namely, acrylate resin obtained by esterifying tricyclodecane dimethanol with acrylic acid is added to acrylate mixture (a) which contains phenol modified epoxy acrylate as its basis and the ratio of components is varied in the resultant mixture; acrylate resin obtained by esterifying tricyclodecane dimethanol with acrylic acid is added to acrylate mixture (b) which contains unsaturated polyester acrylate having no alicyclic ring as its basis and the ratio of components is varied in the resultant mixture. The addition of acrylate resin obtained by esterifying tricyclodecane dimethanol with acrylic acid reduced hygroscopicity. This means that the acrylate resin obtained by esterifying tricyclodecane dimethanol with acrylic acid contributes to improved humidity resistance.

The same effect is expected in poly- or oligo-acrylate which is poly- or oligo-acrylate ester obtained as a result of coesterification of at least polybasic acid, polyhydric alcohol and acrylic acid or methacrylic acid, wherein the polybasic acid and the polyhydric alcohol each have alicyclic structure.

High-accuracy and reliable turning mirror is achieved by forming a high reflectivity film on a mirror-grade accuracy coating layer made of a photo-setting resin obtained by mixing a photo-setting agent to poly- or oligo-acrylate which is poly- or oligo-acrylate ester obtained as a result of coesterification of at least polybasic acid, polyhydric alcohol and acrylic acid or methacrylic acid, wherein the polybasic acid and the polyhydric alcohol each have alicyclic structure.

As discussed above, in a turning mirror having one or more reflector mirror surfaces according to the present invention, surface treatment is performed, as appropriate, onto at least part of the surface of a base mount having a cylindrical or prismatic column in order to reinforce adhesion with photo-setting resin in a first step, photo-setting resin is coated in the form of film onto at least part of the surface-treated surface in first step, the base mount, the resin and a glass plate are fixed in a manner that allows the coated surface to be in contact with the glass plate with the side fringe portion of film-like coated resin being partially or entirely open, the surface to be photo-set is evenly irradiated by resin setting light in order to set resin. By separating the glass plate, the irregularity and flatness of the glass plate is transferred to resin. In a second step, a turning mirror is fabricated by forming a mirror surface by depositing a metallic film having a high reflectivity on top of the set resin film. This method does not require that the entire mold in use be made of metal, and the fabrication of jigs for mold is easy. High temperature and high pressure conditions are not necessary for molding, setting conditions to assure required accuracy are less rigorous. Since a base mount which contributes to thermal stabilization is position at center, a substantially uniform thickness is assured in mirror forming resin portion and a turning mirror stable against ambient temperature variations is achieved. In the construction of the turning mirror, resin film may be formed using as a reference the rotating shaft attached to a base mount at its center, no inclination compensation is needed even if the turning mirror is applied as a polarizer. Thus, assembly and adjustment are simplified.

By forming multi-layer structure rather than single-layer structure, poor flatness accuracy of a base mount may be compensated for by each lamination of the layers even if resin suffers shrinkage in its setting process. This improves transferability of geometry and surface of a mold for resin or a transfer plate.

In a turning mirror in which mirror-grade resin coating is formed onto at least part of the peripheral surface of a base mount having a cylindrical or prismatic column and then a mirror surface is placed by forming a high reflectivity film on top of the resin coating, well surface-transferred and reliable turning mirror is achieved by using a photo-setting resin obtained by mixing a photo-setting agent to poly- or oligo-acrylate which is poly- or oligo-acrylate ester obtained as a result of coesterification of at least polybasic acid, polyhydric alcohol and acrylic acid or methacrylic acid, wherein the polybasic acid and the polyhydric alcohol each have alicyclic structure.

What is claimed is:

1. A turning mirror comprising a base mount having at its center a rotating shaft, a support pole, extended from the rotating shaft, having a slantly cut end which serves as a substrate, a photo-setting resin layer attached onto the substrate at the slant end of the support pole, and a reflector mirror surface made mainly of metallic film and formed on the photo-setting resin layer, wherein the reflector mirror surface is rotated by the rotation of the rotating shaft allowing reflected light by the reflector mirror surface to scan.

2. A turning mirror comprising a base mount having at its center a rotating shaft, a support pole, extended from the rotating shaft, having a slantly cut end which serves as a substrate, photo-setting resin multiple layers attached onto the substrate at the slant end of the support pole, and a reflector mirror surface made mainly of metallic film and formed on the photo-setting resin multiple layers, wherein the reflector mirror surface is rotated by the rotation of the rotating shaft allowing reflected light by the reflector mirror surface to scan.

3. A method of manufacturing a turning mirror, comprising the steps of:
   (a) providing a base mount having at its center a rotating shaft and a support pole extending from the rotating shaft, the support pole having a slantedly cut end;
   (b) providing on the slantedly cut end a plurality of resin layers having a surface irregularity of Rmax 0.3 μm or more;
   (c) providing on the plurality of resin layers an outermost resin layer having a surface irregularity of Rmax less than 0.3 μm; and
   (d) providing on the outermost resin layer a reflector mirror surface made of mainly metallic film.

4. In a turning mirror having one or more reflector surfaces which are fabricated by forming resin coating film with mirror-grade flat accuracy and then by forming a high reflectivity thin film on top of the resin coating film, said turning mirror at least containing the following A components and B components;
   A components: poly- or oligo-acrylate which is poly- or oligo-acrylate ester obtained as a result of coesterification of at least polybasic acid, polyhydric alcohol and acrylic acid or methacrylic acid, wherein the polybasic acid and the polyhydric alcohol each have alicyclic structure; and
   B components: photo-setting agents.

5. The turning mirror according to claim 4, wherein the polyhydric alcohol having alicyclic structure is a compound selected from tricyclodecane dimethanol, 2–8 mol adduct of ethylene oxide with tricyclodecane dimethanol, and 2–8 mol adduct of propylene oxide with tricyclodecane dimethanol.

6. A method of manufacturing a turning mirror comprising the steps of: coating a photo-setting resin onto one or more surfaces of a base mount, said one or more surfaces serving as a substrate for a reflector mirror surface, placing a setting light transmitting glass plate into contact with the resin coating layer with a peripheral side fringe of the photo-setting resin layer partially or entirely open, positioning and holding the base mount, the coated resin layer made of the photo-setting resin and the glass plate in an exposing position, irradiating a setting area of said photo-setting resin with setting light via shining light through the glass plate while the base mount and the glass plate are held in said exposing position, separating the glass plate from the resin layer when fully set, and forming a reflector film capable of reflecting light, onto the resin coating layer.

7. A method of manufacturing a turning mirror, comprising the steps of:
   a) providing a polygonal base mount having a rotating shaft and a plurality of surfaces;
   (b) providing on each of the plurality of surfaces a plurality of resin layers having a surface irregularity of Rmax 0.3 μm or more;
   (c) providing on the plurality of resin layers on each of the plurality of surfaces an outermost resin layer having a surface irregularity of Rmax less than 0.3 μm; and
   (d) providing on the outermost resin layer on each of the plurality of surfaces a reflector mirror surface made of mainly metallic film.

* * * * *